US012552607B2

(12) United States Patent
Tomiyama et al.

(10) Patent No.: US 12,552,607 B2
(45) Date of Patent: Feb. 17, 2026

(54) CARGO HANDLING WORK CREATION DEVICE AND CARGO HANDLING WORK CREATION METHOD

(71) Applicant: JFE STEEL CORPORATION, Tokyo (JP)

(72) Inventors: Shinji Tomiyama, Tokyo (JP); Takao Mori, Tokyo (JP); Keimei Hiroumi, Tokyo (JP); Yuma Nishikawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 813 days.

(21) Appl. No.: 17/791,958

(22) PCT Filed: Oct. 8, 2020

(86) PCT No.: PCT/JP2020/038179
§ 371 (c)(1),
(2) Date: Jul. 11, 2022

(87) PCT Pub. No.: WO2021/152920
PCT Pub. Date: Aug. 5, 2021

(65) Prior Publication Data
US 2023/0062204 A1 Mar. 2, 2023

(30) Foreign Application Priority Data
Jan. 29, 2020 (JP) .................. 2020-012557

(51) Int. Cl.
*B65G 1/137* (2006.01)
*B65G 1/04* (2006.01)
(Continued)

(52) U.S. Cl.
CPC ......... *B65G 1/1373* (2013.01); *B65G 1/0464* (2013.01); *B65G 1/137* (2013.01);
(Continued)

(58) Field of Classification Search
CPC .... B65G 1/1373; B65G 1/0464; B65G 1/137; B65G 63/00; B65G 1/1378; B65G 63/002; G06Q 10/083; G06Q 10/08; G06Q 10/087
See application file for complete search history.

(56) References Cited

U.S. PATENT DOCUMENTS 2,299,040 A * 10/1942 Schwartz ............... D06C 5/005
34/103
3,705,410 A 12/1972 Kooy et al.
(Continued)

FOREIGN PATENT DOCUMENTS

CN 203855168 U 10/2014
CN 104411609 B 7/2016
(Continued)

OTHER PUBLICATIONS

RU-2706127-C2 (Year: 2019).*
(Continued)

*Primary Examiner* — Ernesto A Suarez
*Assistant Examiner* — Laurence R Brothers
(74) *Attorney, Agent, or Firm* — Oliff PLC (57) ABSTRACT

A cargo handling work generation device includes: an inventory information database; a shipping product information database; a master information database; a status judging unit configured to judge whether cargo handling work of product organization be assigned to a cargo handling facility provided in a product storage space, based on operation information on a cargo handling facility; a product organization work determination unit configured to, when the status judging unit judges to assign the cargo handling work of product organization to the cargo handling facility, determine a content of the cargo handling work of product organization to be executed, using the information stored in the inventory information database, the shipping product (Continued)

information database, and the master information database; and an output unit configured to output instruction information for instructing a control system of the cargo handling facility to execute the determined cargo handling work of product organization.

8 Claims, 7 Drawing Sheets

(51) Int. Cl.
*B65G 63/00* (2006.01)
*G06Q 10/08* (2024.01)
*G06Q 10/087* (2023.01)
*G06Q 10/083* (2024.01)

(52) U.S. Cl.
CPC ........... *B65G 63/002* (2013.01); *G06Q 10/08* (2013.01); *G06Q 10/087* (2013.01)

(56) References Cited

U.S. PATENT DOCUMENTS

| | | | |
|---|---|---|---|
| 5,780,826 A | 7/1998 | Hareyama et al. | |
| 8,425,173 B2 | 4/2013 | Ert et al. | |
| 8,594,835 B2 | 11/2013 | Lert et al. | |
| 8,740,538 B2 | 6/2014 | Lert et al. | |
| 9,051,120 B2 | 6/2015 | Lert et al. | |
| 9,096,375 B2 | 8/2015 | Lert et al. | |
| 9,321,591 B2 | 4/2016 | Lert et al. | |
| 9,694,975 B2 | 7/2017 | Lert et al. | |
| 9,725,239 B2 | 8/2017 | Lert et al. | |
| 9,771,217 B2 | 9/2017 | Lert et al. | |
| 10,035,649 B2 | 7/2018 | Lert et al. | |
| 10,207,870 B2 | 2/2019 | Sullivan et al. | |
| 10,239,691 B2 | 3/2019 | Lert et al. | |
| 10,414,585 B2 | 9/2019 | Hamaguchi | |
| 10,442,622 B2 | 10/2019 | Lert et al. | |
| 10,556,743 B2 | 2/2020 | Sullivan et al. | |
| 10,717,599 B2 | 7/2020 | Lert et al. | |
| 10,759,600 B2 | 9/2020 | Sullivan et al. | |
| 10,940,997 B2 | 3/2021 | Ueda | |
| 11,124,361 B2 | 9/2021 | Lert et al. | |
| 11,254,501 B2 | 2/2022 | Sullivan et al. | |
| 2006/0106684 A1 | 5/2006 | Aoki et al. | |
| 2010/0316468 A1 | 12/2010 | Lert et al. | |
| 2010/0316469 A1 | 12/2010 | Lert et al. | |
| 2010/0316470 A1 | 12/2010 | Lert et al. | |
| 2010/0322746 A1 | 12/2010 | Lert et al. | |
| 2010/0322747 A1 | 12/2010 | Lert et al. | |
| 2011/0106295 A1* | 5/2011 | Miranda | B65G 1/1378 700/216 |
| 2014/0088758 A1 | 3/2014 | Lert et al. | |
| 2014/0271063 A1 | 9/2014 | Lert et al. | |
| 2014/0308098 A1 | 10/2014 | Lert et al. | |
| 2015/0266672 A1 | 9/2015 | Lert et al. | |
| 2015/0375938 A9 | 12/2015 | Lert et al. | |
| 2016/0185526 A1 | 6/2016 | Lert et al. | |
| 2016/0236866 A1 | 8/2016 | Sullivan et al. | |
| 2017/0355525 A1 | 12/2017 | Hamaguchi | |
| 2017/0362032 A1 | 12/2017 | Sullivan et al. | |
| 2018/0016098 A1 | 1/2018 | Lert et al. | |
| 2018/0282063 A1 | 10/2018 | Ueda | |
| 2018/0334325 A1 | 11/2018 | Lert et al. | |
| 2019/0135539 A1 | 5/2019 | Heide et al. | |
| 2019/0177088 A1 | 6/2019 | Sullivan et al. | |
| 2019/0218034 A1 | 7/2019 | Caveney | |
| 2020/0039744 A1 | 2/2020 | Lert et al. | |
| 2020/0172336 A1 | 6/2020 | Sullivan et al. | |
| 2020/0346866 A1 | 11/2020 | Lert et al. | |
| 2020/0399064 A1 | 12/2020 | Sullivan et al. | |
| 2021/0294930 A1* | 9/2021 | Cai | G06N 3/0464 |
| 2022/0002083 A1 | 1/2022 | Lert et al. | |
| 2022/0177226 A1 | 6/2022 | Sullivan et al. | |

FOREIGN PATENT DOCUMENTS

| | | | |
|---|---|---|---|
| CN | 104781170 B | 8/2016 | |
| CN | 108140165 A | 6/2018 | |
| CN | 109615300 A | 4/2019 | |
| JP | H06-179512 A | 6/1994 | |
| JP | H11-278616 A | 10/1999 | |
| JP | 2013-1558 A | 1/2013 | |
| JP | 2013001558 A * | 1/2013 | |
| JP | 2016222455 A * | 12/2016 | |
| RU | 2706127 C2 * | 11/2019 | ............... B65G 1/04 |
| TW | I615337 B | 2/2018 | |
| TW | I656080 B | 4/2019 | |
| WO | 96/30288 A1 | 10/1996 | |
| WO | WO-03019425 A1 * | 3/2003 | ........... B65G 1/0435 |
| WO | 2004/028934 A1 | 4/2004 | |
| WO | WO-2014061252 A1 * | 4/2014 | ........... G06Q 10/083 |
| WO | 2014/066976 A1 | 5/2014 | |

OTHER PUBLICATIONS

WO-03019425-A1 (Year: 2003).*
WO-2014061252-A1 (Year: 2014).*
JP-2013001558-A (Year: 2013).*
JP-2016222455-A (Year: 2016).*
Dec. 27, 2022 Office Action issued in Russian Patent Application No. 2022120043.
Dec. 15, 2020 International Search Report issued in International Patent Application No. PCT/JP2020/038179.
Jun. 29, 2021 Office Action issued in Taiwanese Patent Application No. 109146127.
Nov. 26, 2024 Office Action issued in Korean Patent Application No. 10-2022-7024186.
Jun. 27, 2023 Extended European Search Report Issued in European Patent Application No. 20916734.5.
Nov. 23, 2023 Office Action issued in Chinese Patent Application No. 202080094688.8.

* cited by examiner

| BUILD-ING | ROW | AD-DRESS | LEVEL | PROD-UCT NO. | ABSOLUTE POSITION (TRAVELING) | ABSOLUTE POSITION (TRANSVERSE) | ABSOLUTE POSITION (HEIGHT) | OUTER DIAM-ETER | WIDTH | THICK-NESS | WEIGHT | DELIVERY DATE | CUS-TOMER ID | DESTI-NATION ID |
|---|---|---|---|---|---|---|---|---|---|---|---|---|---|---|
| 1 | 1 | 1 | 1 | A0001 | 1000 | 12000 | 650 | 1300 | 1000 | 1.0 | 12 | 2014/11/5 | PQQ | KZ03 |
| 1 | 1 | 2 | 1 | A0002 | 1000 | 13800 | 650 | 1300 | 1000 | 1.0 | 12 | 2014/11/5 | PQQ | KZ03 |
| 1 | 1 | 1 | 2 | A0003 | 1000 | 12900 | 1500 | 1250 | 900 | 1.2 | 11 | 2014/11/5 | PQQ | KZ03 |
| ... | ... | ... | ... | ... | ... | ... | ... | ... | ... | ... | ... | ... | ... | ... |

FIG.5

| PRODUCT NO. | STORAGE BUILDING | SCHEDULED SHIPMENT DATE AND TIME | SHIPMENT LOT ID | VESSEL ID | CUSTOMER ID | SHIPPING QUAY ID | DESTINATION ID |
|---|---|---|---|---|---|---|---|
| A0001 | 1 | 2014/11/3 11:15 | S1834 | L9K411 | PQQ | AB01 | KZ03 |
| A0002 | 1 | 2014/11/3 11:17 | S1834 | L9K411 | PQQ | AB01 | KZ03 |
| A0003 | 1 | 2014/11/3 11:19 | S1834 | L9K411 | PQQ | AB01 | KZ03 |
| B0001 | 2 | - | - | - | NSK | - | TN09 |
| ... | ... | ... | ... | ... | ... | ... | ... |

FIG.6

| BUILDING | ROW | ADDRESS | MAXIMUM OUTER DIAMETER | MINIMUM OUTER DIAMETER | MAXIMUM WIDTH | MINIMUM WIDTH | MAXIMUM NUMBER OF STACKS |
|---|---|---|---|---|---|---|---|
| 1 | 1 | 1 | 1500 | 800 | 1200 | 900 | 3 |
| 1 | 1 | 2 | 1500 | 800 | 1200 | 900 | 3 |
| 1 | 1 | 3 | 1500 | 800 | 1200 | 900 | 2 |
| ⋮ | ⋮ | ⋮ | ⋮ | ⋮ | ⋮ | ⋮ | ⋮ |

CARGO HANDLING WORK CREATION DEVICE AND CARGO HANDLING WORK CREATION METHOD

FIELD

The present invention relates to a cargo handling work generation device and a cargo handling work generation method that generate cargo handling work for products in a product storage space.

BACKGROUND

In most cases, products (for example, steel products) manufactured in factories such as steel mills are temporarily stored in a product storage space in factory premises or distribution centers, before being conveyed and shipped to customers. In general, a production lot at the time of manufacturing products is a group of products collected into an easily manufacturable unit during the production process in a factory. In contrast, a distribution lot at the time of shipment of products is a group of products collected based on the location of a customer (that is, delivery destination) to whom the product is to be delivered. Thus, the production lot and the distribution lot of products often differ from each other, and even if the products have the same production lot, the distribution lots of the products may not necessarily be the same. Therefore, a product storage space is required as a buffer for lot adjustment that manages each product with each production lot by classifying each product into each distribution lot.

In the product storage space as described above, products are often stored in a stacked manner. This is because, when products are stacked, the storage capacity of products in the product storage space is increased, and the site area of the product storage space and cargo handling facilities such as cranes can be effectively used. However, when products are stored in a product storage space in a stacked manner, constraints are often applied to a product to be mounted on the top, depending on the size, characteristics (deformability), and the like of the product. Specifically, when a product significantly large in size is placed on a product small in size, it causes imbalance, and risks such as products falling off and a pile of products collapsing will be increased.

Due to such reasons, constraints must be met by products to be mounted. Due to constraints, the amount of products that can be placed in the entire product storage space (storage capacity) varies significantly depending on how the products are mounted. Because the amount of products that come into and that go out from the product storage space changes with time, the storage capacity of the product storage space is preferably large enough such that the change can be sufficiently absorbed. For example, if shipment by sea is cancelled due to bad weather, shipping products cannot be taken out from the product storage space, and the stock in the product storage space is increased rapidly. If the storage capacity is small, factories may not be able to send out products to the product storage space, and the factories may have to stop production.

As a conventional technology related to the stacking (piling) of products to be stored in a product storage space, there is a technology of determining an unloading destination of a product by a crane according to a predetermined priority order of piling, while taking into an account the product size, the usage availability of temporary stacking space, the transportation form of product, the operability of crane, and the like. Specifically, Patent Literature 1 discloses a method of determining where to place a product that has come into a product storage space based on various types of information. In detail, the method disclosed in Patent Literature 1 determines the storage space, by determining the row of storage space from information such as size, searching the storage space sequentially from the top level, and checking whether the constraints of the storage space at the top level is satisfied. The storage space is sequentially searched from the top level to increase the storage capacity of the entire product storage space by stacking as many products as possible. Moreover, to dispatch a coil product, Patent Literature 2 discloses a method of optimizing the work of moving a product to a cargo arrangement place by a crane, and determining which coil is to be moved to which location in the cargo arrangement place in what order. Furthermore, Patent Literature 2 discloses a method of selecting the optimal work order by running simulations on a plurality of candidates of coil moving work groups.

CITATION LIST

Patent Literature

Patent Literature 1: Japanese Patent Application Laid-open No. H6-179512
Patent Literature 2: Japanese Patent Application Laid-open No. H11-278616

SUMMARY

Technical Problem

The method disclosed in Patent Literature 1 relates to a method of determining a storage space at the timing when a product has entered the product storage space. However, the products placed in the product storage space are taken out from the product storage space in a short while, and every time a product is taken out from the product storage space, the state of a pile of products in the entire product storage space is changed. Therefore, the storage capability of the product storage space can be maintained at a high level in a stable manner, if the product arrangement is changed by rearranging the product storage space at a suitable timing, in addition to the timing when a product enters the product storage space. However, to change the product arrangement, a plurality of candidates of the moving product and a plurality of candidates of the storage space at the moving destination must be determined, and a problem more complicated than that in the method disclosed in Patent Literature 1 needs to be solved. However, there is no description in Patent Literature 1 regarding the problem. Moreover, because products constantly come into and go out from the product storage space, it is not realistic to strictly optimize the arrangement in the product storage space. Hence, it is preferable to arrange products so that the storage capability of the product storage space is increased without increasing the number of times the cargo handling facilities are handled.

On the other hand, the method disclosed in Patent Literature 2 aims to effectively take out the dispatching product, and there is no direct effect on storing many products in the product warehouse. Moreover, similar to the method disclosed in Patent Literature 1, in the method disclosed in Patent Literature 2, the fact that products constantly come into and go out from the product storage space is not taken into account. Hence, the arrangement in the storage space is changed in the middle of simulation, and in many cases, the scheduled work order cannot be completed as planned. Furthermore, the simulation calculation must be implemented on an actual device. Hence, there is a disadvantage of making program development complicated.

The present invention has been made in view of the above problems, and an object of the present invention is to provide a cargo handling work generation device and a cargo handling work generation method that can increase the storage capacity of the product storage space.

Solution to Problem

A cargo handling work generation device according to the present invention includes: an inventory information database configured to store inventory information indicating at least a storage location of a product currently stored in a product storage space; a shipping product information database configured to store shipping product information indicating a shipping condition of the product; a master information database configured to store a constraint related to product arrangement in the product storage space; a status judging unit configured to judge whether cargo handling work of product organization be assigned to a cargo handling facility provided in the product storage space, based on operation information on the cargo handling facility; a product organization work determination unit configured to, when the status judging unit judges to assign the cargo handling work of product organization to the cargo handling facility, determine a content of the cargo handling work of product organization to be executed, using the information stored in the inventory information database, the shipping product information database, and the master information database; and an output unit configured to output instruction information for instructing a control system of the cargo handling facility to execute the cargo handling work of product organization determined by the product organization work determination unit, wherein the product organization work determination unit includes a storage space checking unit configured to extract a constraint to be satisfied by a product in each empty storage space in the product storage space, a product checking unit configured to calculate a margin for the constraint of the product in each of the empty storage space, and a work generation unit configured to generate moving work for moving a product to each empty storage space, based on the constraint and the margin.

The constraint may include a condition related to dimension and weight of a product to be stacked, and the work generation unit may be configured to preferentially select an empty storage space at a high location, when an empty storage space at a moving destination of the product is to be determined.

The margin may be a value according to a differential value between upper and lower limit values of dimension and weight of a product specified in the constraint and actual dimension and weight of the product.

A cargo handling work generation method according to the present invention includes: a status judging step of judging whether cargo handling work of product organization be assigned to a cargo handling facility provided in a product storage space, based on operation information on the cargo handling facility; a product organization work determination step of determining product organization work that, when the cargo handling work of product organization is judged to be assigned to the cargo handling facility at the step of judging status, determines a content of the cargo handling work of product organization to be executed, using information stored in an inventory information database that stores inventory information indicating at least a storage location of a product currently stored in the product storage space, a shipping product information database that stores shipping product information indicating a shipping condition of the product, and a master information database that stores a constraint related to product arrangement in the product storage space; and an outputting step of outputting instruction information for instructing a control system of the cargo handling facility to execute the cargo handling work of product organization determined at the step of determining product organization work, wherein the product organization work determination step includes a storage space checking step of extracting a constraint to be satisfied by a product in each empty storage space in the product storage space, a product checking step of calculating a margin for the constraint of the product in each of the empty storage space, and a work generation step of generating moving work for moving a product to each empty storage space, based on the constraint and the margin.

The constraint may include a condition related to dimension and weight of a product to be stacked, and the work generation step may include a step of preferentially selecting an empty storage space at a high location, when an empty storage space at a moving destination of the product is to be determined.

The margin may be a value according to a differential value between upper and lower limit values of dimension and weight of a product specified in the constraint and actual dimension and weight of the product.

Advantageous Effects of Invention

With the cargo handling work generation device and the cargo handling work generation method according to the present invention, it is possible to increase the storage capacity of the product storage space.

DESCRIPTION OF EMBODIMENTS

Hereinafter, a configuration and operations of a cargo handling work generation device according to an embodiment of the present invention will be described in detail with reference to the accompanying drawings.

Configuration of Cargo Handling Work Creation Device

First, with reference to FIG. 1, a configuration of a cargo handling work generation device according to an embodiment of the present invention will be described.

Figure 1:
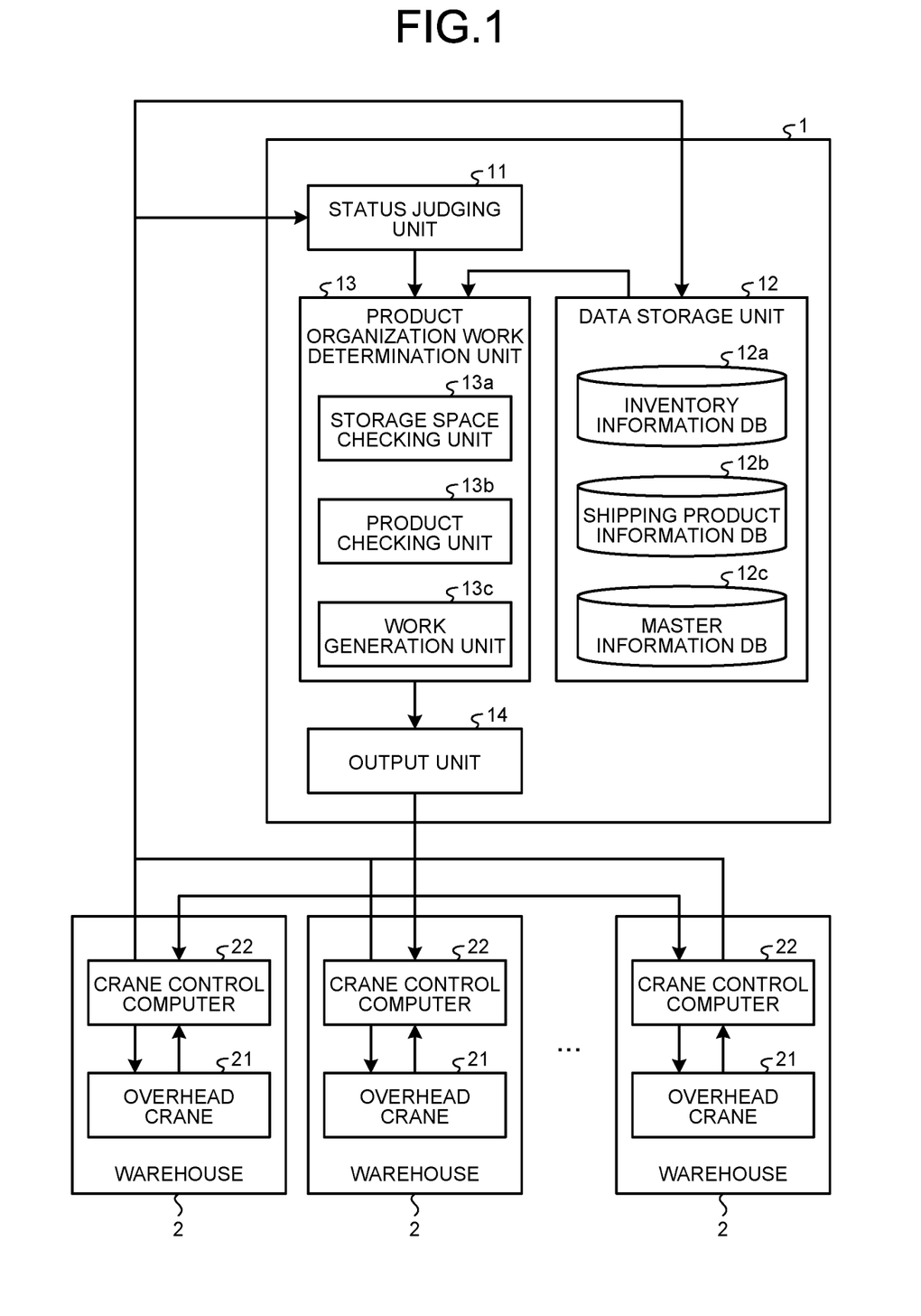
FIG. 1 is a block diagram illustrating a configuration of a cargo handling work generation device according to an embodiment of the present invention.

FIG. 1 is a block diagram illustrating a configuration of a cargo handling work generation device according to an embodiment of the present invention. As illustrated in FIG. 1, a cargo handling work generation device 1 according to the embodiment of the present invention is configured by an information processing device such as a computer, and generates cargo handling work for products in each of a plurality of warehouses 2 (a conveyance operation of products in the warehouses 2). In the present embodiment, the cargo handling work generation device 1 includes a status judging unit 11 that judges whether cargo handling work of product organization be assigned to an overhead crane 21 based on the operation status of the overhead crane 21 in the warehouse 2; a data storage unit 12 that stores information on the warehouses 2; a product organization work determination unit 13 that, when the cargo handling work of product organization is determined to be assigned to the overhead crane 21, performs various processes required for creating the cargo handling work; and an output unit 14 that outputs information for instructing each of the warehouses 2 and the overhead crane 21 to perform the generated cargo handling work.

The status judging unit 11 collects information on the work status of the overhead crane 21 from each of the warehouses 2, and if the work status satisfies a predetermined setting condition, the status judging unit 11 activates the product organization work determination unit 13 to generate work for product organization with respect to the overhead crane 21. The followings are examples of the setting condition. For example, the setting conditions (a) and (b) can be checked from the work plan of the overhead crane 21, and the setting condition (c) can be checked from the inventory information on the warehouse 2.

(a) Cargo handling work is not currently in progress, and there is no receiving and dispatching work being booked
(b) Shipping product assortment work is not currently in progress, and there is no shipping product assortment work being booked
(c) The number of products scheduled to be shipped in the near future in the warehouse is less than the set number For example, if the setting conditions (a) to (c) are all satisfied, the status judging unit 11 can judge that the overhead crane 21 is in a state capable of performing cargo handling work of product organization. In the setting conditions (a) to (c) described above, there is no immediate cargo handling work to be done, and the shipping product is not buried under a pile of products. Hence, it is possible to perform product organization work so that as many products as possible can be placed in the warehouse.

The data storage unit 12 is configured by a non-volatile storage device, and stores various types of information on product storage in each of the warehouses 2 in an updatable manner. Every time the warehouse operation performance information transmitted sequentially from a crane control computer 22 of each warehouse is received, the data storage unit 12 stores the received warehouse operation performance information as the latest information. In this process, the data storage unit 12 updates the warehouse operation performance information that has already been stored, to the latest warehouse operation performance information. The warehouse operation performance information is information indicating the operation performance in each warehouse 2 such as receiving and dispatching a product, and includes the inventory information and shipping product information on each warehouse 2.

In the present embodiment, the data storage unit 12 includes an inventory information database (inventory information DB) 12a, a shipping product information database (shipping product information DB) 12b, and a master information database (master information DB) 12c.

The inventory information DB 12a stores the inventory information in the warehouse operation performance information from the warehouses 2 in an updatable manner. In the present embodiment, the inventory information is information indicating at least a storage location of a product currently stored in each of the warehouses 2, including the warehouse to be controlled by the cargo handling work generation device 1 (hereinafter, referred to as a target warehouse). Specifically, the inventory information includes product identification information such as a product number that identifies a product, location information that identifies the storage location of a product, product specification information that indicates specifications such as product size and weight, and the like, as information on a product currently stored in each of the warehouses 2. Every time the inventory information in the warehouse operation performance information transmitted from each crane control computer 22 of the warehouses 2 is acquired, the inventory information DB 12a stores the acquired inventory information as the latest information on each warehouse (including the target warehouse). In this process, the inventory information DB 12a updates the inventory information on the target warehouse to the latest inventory information acquired from the target warehouse. Specific examples of the inventory information will be described below with reference to FIG. 4.

The shipping product information DB 12b stores the shipping product information in the warehouse operation performance information from the warehouses 2 in an updatable manner. In the present embodiment, the shipping product information is information indicating the shipping conditions of a product currently stored in each of the warehouses 2 including the target warehouse. Specifically, the shipping product information includes product identification information such as a product number, information indicating the shipping schedule of the product, information indicating the distribution lot of the product at the time of shipment, information that identifies the shipping destination (delivery destination) of the product, and the like, as shipping conditions of a product currently stored in each of the warehouses 2. For a product the shipment schedule (such as the vessel on which the product will be loaded and the date and time of loading operation) of which is not yet confirmed, information indicating the shipping schedule is left blank. Every time the shipping product information in the warehouse operation performance information transmitted from each crane control computer 22 of the warehouses 2 is acquired, the shipping product information DB 12b stores the acquired shipping product information as the latest information on each warehouse 2 (including the target warehouse). In this process, the shipping product information DB 12b updates the shipping product information on the target warehouse, to the latest shipping product information acquired from the target warehouse. Specific examples of the shipping product information will be described below with reference to FIG. 5.

The master information DB 12c stores constraints related to the product arrangement in each warehouse 2 or the cargo handling work generation device 1 in an updatable manner.

In the present embodiment, the constraints include conditions such as the size and weight of a product that can be stored in the warehouses 2, conditions that are referred to by the status judging unit 11 to determine whether to perform the product organization work, and the like. The master information DB 12c acquires each of the constraints by referring to the information input from an input device and the like, and stores the acquired constraint. Moreover, every time the update instruction information is input via an input device, the master information DB 12c updates the constraints to the latest constraints based on the acquired update instruction information. Specific examples of constraints will be described below with reference to FIG. 6.

The product organization work determination unit 13 performs various processes to determine the cargo handling work of product organization, for the target warehouse, which is an object to be controlled, among the warehouses 2. In the present embodiment, the product organization work determination unit 13 includes a storage space checking unit 13a, a product checking unit 13b, and a work generation unit 13c.

When one empty storage space in the target warehouse is specified, the storage space checking unit 13a extracts conditions that must be satisfied by a product to be placed in the storage space. The extraction conditions are conditions related to the length, width, height, weight, and the like for a box-shaped product, and the width, outer diameter, weight, and the like for a coiled product. In general, products are often stacked up in a warehouse, and the constraints on the storage space vary depending on the nature of the product placed underneath. For example, if a deformable product is placed underneath, another product may not be placed on the top of the product. Moreover, in general, a product the width, length, and weight of which are significantly greater than those of a product placed underneath, cannot often be placed on the top. Furthermore, in a warehouse where coiled products are piled up, when the outer diameter of an adjacent coil is large, the coil is placed without coming into contact with the coil underneath. This is referred to as a "floating coil", and because products are stored in an unstable manner, this situation should be avoided from a safety point of view. Moreover, when a product scheduled to be shipped in the near future is placed, a product not scheduled to be shipped (scheduled to be shipped later) is sometimes prohibited from being placed on the top of the product, to prevent shipping work efficiency from being lowered. As described above, the storage space checking unit 13a extracts the conditions of the product to be placed in the specified storage space.

When one storage space is specified, the product checking unit 13b checks the status of each product in the warehouse 2 for the constraints related to the specified storage space. The followings are examples of contents to be checked.

(a) Check whether the target product is satisfying the constraints at the specified storage space (b) Check how much margin the target product has with respect to the constraints at the specified storage space (whether the constraints are satisfied with a sufficient margin)

For example, the content (b) to be checked described above indicates how much the width, length, and weight of a target product coil differ from the upper limit values of the width, length, and weight of the specified storage space. For example, if the weight matches with the upper limit value, it means that the margin of the weight constraints is zero.

The work generation unit 13c selects and specifies one storage space from a plurality of empty storage spaces, activates the storage space checking unit 13a, and extracts constraints on the target storage space. Moreover, the work generation unit 13c activates the product checking unit 13b, and acquires margin information on the constraints of the specified storage space for each stocked product. The work generation unit 13c performs this process on each of the empty storage spaces, and finally determines the product to be moved and the empty storage space at the moving destination, based on the margin information on the acquired constraints. For example, a candidate for an empty storage space to be selected and specified includes a storage space at a location as high as possible. If the storage space at a location as high as possible is specified, the height of a pile of products can be increased, and more products can be easily stored in the warehouse. Then, a product placed at a lower location than the specified storage space at a higher location is selected as a candidate for the moving product (however, a product placed below the specified storage space is excluded from being a candidate for the moving product). Among the products selected as candidates to be moved to the specified storage space, if a product with the least margin from the constraints of the specified storage space is selected as a product to be moved to the specified storage space, more products can be easily stored in the warehouse. If a margin with respect to the constraints is large, in general, it means that the size of the product is small, and it is difficult to mount another product thereon.

The output unit 14 outputs instruction information on the cargo handling work that is determined to be executed on the target warehouse among the warehouses 2. Specifically, the output unit 14 outputs instruction information (hereinafter, referred to as cargo handling work instruction information) for instructing a control system of a cargo handling facility of the target warehouse, to perform the cargo handling work determined to be executed by the product organization work determination unit 13. An example of the cargo handling facility of the target warehouse is the overhead crane 21. An example of the control system of the cargo handling facility is the crane control computer 22.

Configuration of Warehouse

Next, the configuration of the warehouses 2 the operation of which is controlled by the cargo handling work generation device 1 according to the embodiment of the present invention, will be described. The warehouses 2 illustrated in FIG. 1 are located in the premises of a factory such as a steel mill or a distribution center. Each of the warehouses 2 serves as a buffer for lot adjustment that stores each product (specifically, a steel product) manufactured in a factory such as a steel mill, and that manages each product, which is classified into each production lot, by classifying each product into each distribution lot.

Figure 2:
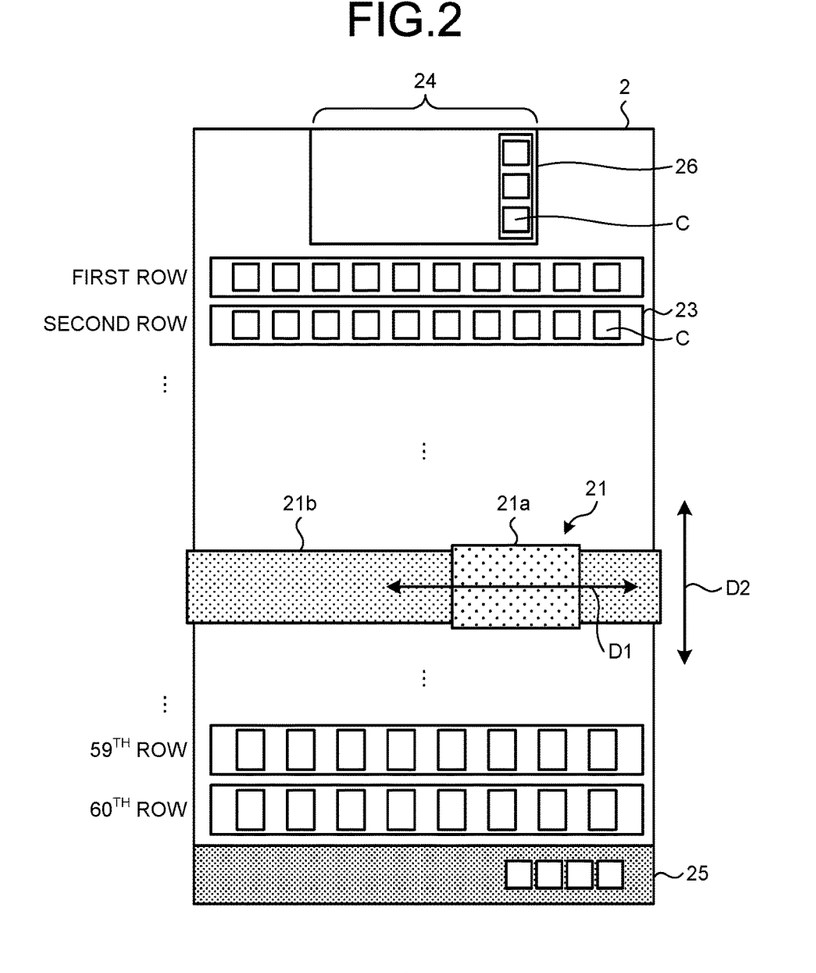
FIG. 2 is a schematic diagram illustrating a configuration of a warehouse according to the embodiment of the present invention.
Figure 3:
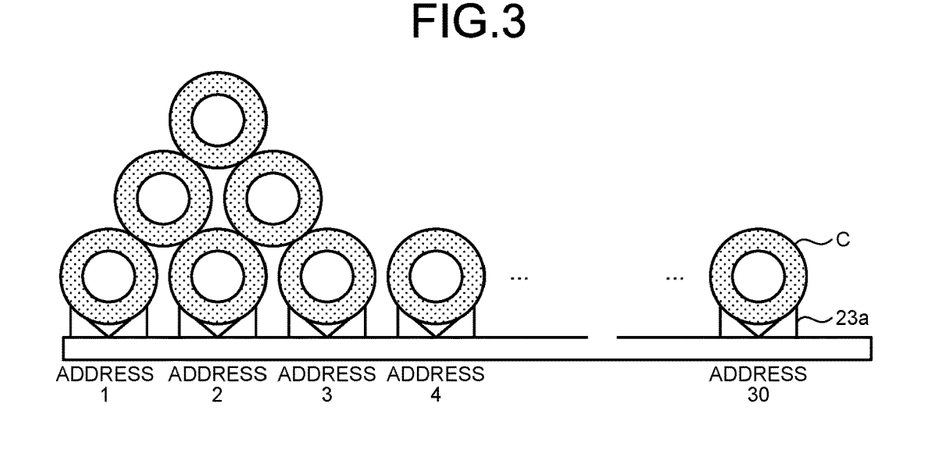
FIG. 3 is a diagram illustrating an example of a storage state of products in the warehouse.

FIG. 2 is a schematic diagram illustrating a configuration of a warehouse according to the embodiment of the present invention. FIG. 2 illustrates a top view of one of the warehouses 2. The crane control computer 22 in the warehouse 2 is illustrated in FIG. 1, but the illustration thereof is omitted in FIG. 2. FIG. 3 is a diagram illustrating an example of a storage state of products in the warehouse 2. FIG. 3 illustrates a side view of the products stacked up in the warehouse 2.

Hereinafter, with reference to FIGS. 1 to 3, a configuration of the warehouse 2 will be described. It is assumed that all of the warehouses 2 have the same configuration, and the product stored in the warehouse 2 in the present embodiment is a steel product which is a metal sheet such as a steel sheet rolled into a coil shape (hereinafter, referred to as a coil).

As illustrated in FIGS. 1 to 3, the warehouse 2 includes the overhead crane 21 for cargo handling a product C, the crane control computer 22 for controlling the overhead crane 21 and the like, and a frame 23 on which a plurality of the products C to be stored are placed in a stacked manner and the like. Moreover, the warehouse 2 includes a vehicle loading and unloading bay 24 where the product C is loaded or unloaded using a vehicle and the like, and an off-site temporary storage space 25 where the product C is moved in and moved out in addition to the vehicle loading and unloading bay 24.

The overhead crane 21 is an example of the main cargo handling facility that performs cargo handling work such as receiving and dispatching the product C in the warehouse 2. In the present embodiment, the overhead crane 21 has a crane section 21a and a traveling section 21b. The crane section 21a and the traveling section 21b are devices that automatically perform various operations necessary for cargo handling the product C, such as lifting and lowering the product C, under the control of the crane control computer 22. The crane section 21a is provided on the traveling section 21b, and is movable in the longitudinal direction of the warehouse 2, that is, in a transverse direction D1. The traveling section 21b has a structure in which the longitudinal direction corresponds to a direction parallel to the longitudinal direction of the frame 23, and is installed on the upper part of the warehouse 2. The traveling section 21b can travel in a direction perpendicular to the transverse direction D1, that is, in a traveling direction D2, and transfers the crane section 21a to a desired position in the traveling direction D2 by traveling. The overhead crane 21 having such a configuration can move in the transverse direction D1 of the crane section 21a and in the traveling direction D2 of the traveling section 21b, by unmanned operation (automatic operation) based on the control by the crane control computer 22. Moreover, the overhead crane 21 lifts and conveys the product C using the crane section 21a from a location of a conveyance source (also referred to as a moving source) to the target location of a conveyance destination (also referred to as a moving destination) in the warehouse 2, by unmanned operation based on the control of the crane control computer 22.

The crane control computer 22 transmits control signals corresponding to the cargo handling work necessary for receiving and dispatching the product C, the cargo handling work of rearrangement that enables the shipping product to be taken out easily, or instruction information output from the output unit 14 of the cargo handling work generation device 1 described above, to the overhead crane 21. Consequently, the crane control computer 22 automatically controls each operation of the overhead crane 21 described above. The instruction information on the cargo handling work necessary for receiving and dispatching, and the cargo handling work for rearrangement that enables the shipping product to be taken out easily, which are described above, may be generated by the crane control computer 22 or another external computer (may also be generated by another computer program of the cargo handling work generation device 1 described above). Specifically, upon receiving the cargo handling work instruction information for product organization from the output unit 14, the crane control computer 22 controls the overhead crane 21 to perform the cargo handling work instructed through the cargo handling work instruction information, on the target product in the warehouse 2. During these operations, through the cargo handling work instruction information from the output unit 14, the target product, the location of the current conveyance source, and the location of the target conveyance destination are instructed to the crane control computer 22. The crane control computer 22 then controls the overhead crane 21 to move the target product from the instructed location of the current conveyance source to the location of the target conveyance destination.

Moreover, the crane control computer 22 has a function of managing the operation performance of the warehouse 2. Specifically, the crane control computer 22 obtains information on the product C to be stored in the warehouse 2, from a management computer (not illustrated) on the factory side or the like. The crane control computer 22 updates the acquired information corresponding to the operation such as storage, reception, and dispatch of the product in the warehouse 2, and manages the updated information as information indicating the operation performance of the warehouse, that is, warehouse operation performance information. This warehouse operation performance information includes various types of information on the product currently stored in the warehouse 2, specifically, various types of latest information on the inventory information and the shipping product information described above. The crane control computer 22 transmits such warehouse operation performance information to the data storage unit 12 in the cargo handling work generation device 1 at each predetermined timing. Moreover, the crane control computer 22 transmits warehouse operation status information to the cargo handling work generation device 1 at each predetermined timing. For example, the predetermined timing at which the warehouse operation performance information and the warehouse operation status information described above are transmitted is when transmission of information is requested from the cargo handling work generation device 1, when the overhead crane 21 is activated, when the overhead crane 21 has completed a cycle of crane work (cargo handling work for products), when a certain period of time has passed since the work was completed by the overhead crane 21, and the like.

The installation unit of the frame 23 is one row in the warehouse 2, and a plurality of rows (in the present example, 60 rows) are provided in the warehouse 2 by taking into account the allowable number, allowable size, and the like of the product C to be stored. Each of the rows of the frames 23 includes a fixing table 23a on which the product C to be stored is removably placed. For each frame 23, a plurality (for example, 30) of the fixing tables 23a are provided in the row direction (that is, in the row direction of the warehouse 2), which is the longitudinal direction of the frame 23. In each of the rows of the frames 23 including the fixing tables 23a such as above, the product C to be stored is arranged on the fixing table 23a, and according to the needs, the products C are stacked on the fixing table 23a.

In the present embodiment, the location (storage location) of the product C in a state stored in the warehouse 2 is identified by a combination of a row number L ($=1, 2, \ldots, n-1, n$), an address A ($=1, 2, \ldots, m$), and a level number i ($=1, 2, 3$) of each frame 23. The row number L is information that identifies the row location of the frame 23 in the warehouse 2, and is assigned to each of the rows of the frames 23. The address A is information that identifies the location of the fixing table 23a for each frame 23, and is assigned to each fixing table 23a of each frame 23. The level number i is information that identifies the arrangement level of the product C to be stacked on the frame 23. The level number i is assigned to each frame 23 such that the level number i is increased by one from the fixing table 23a side in the upward direction, assuming that the product C placed directly on the fixing table 23a is on the lowest level ($i=1$). That is, the arrangement level above the product C, which is placed directly on the fixing table 23*a*, is identified by the level number i=2, and the arrangement level one level further above is identified by the level number i=3. However, there are restrictions on the size (such as width and outer diameter) and the type of products that can be placed on each of the frames 23 and each of the fixing tables 23*a* in the warehouse 2, depending on the row number L and the address A. Moreover, for stacking, as described above, there are constraints on the products to be stacked above and below.

In the warehouse 2, the vehicle loading and unloading bay 24 is an area where a cart for transporting the product C, that is, a pallet 26, comes in and goes out. Specifically, when the product C is transported from the factory to the warehouse 2, the pallet 26 that has loaded the product C in the factory moves from the factory to the warehouse 2 by being towed by a transportation vehicle (not illustrated), and is taken to the vehicle loading and unloading bay 24. The product C on the pallet 26 is loaded on the fixing table 23*a* of the frame 23 or on the product C that has already been stored, from the vehicle loading and unloading bay 24 by the overhead crane 21. In this manner, the product C is housed and stored in the warehouse 2.

On the other hand, when a product is transported from the warehouse 2 to a shipping berth (quay), an empty pallet 26 is taken to the vehicle loading and unloading bay 24, or the pallet 26 that has completed the operation of housing the product C in the warehouse 2 waits in the vehicle loading and unloading bay 24. The product C to be transported from the warehouse 2 to the shipping berth is loaded on the empty pallet 26 in the vehicle loading and unloading bay 24 by the overhead crane 21. The pallet 26 loaded with the product C is taken out from the vehicle loading and unloading bay 24 by being towed by the transportation vehicle, and then moved to the shipping berth from the warehouse 2. In this manner, the product C is dispatched from the warehouse 2, and the dispatched product C is loaded on a vessel and the like and is shipped to the customer.

The transportation vehicle that tows the pallet 26 described above can tow another pallet 26, when a product is unloaded from the pallet 26 or when a product is loaded on the pallet 26. In many cases, such a transportation vehicle has a structure separable from the pallet 26. For example, if the product C is a heavy item, it takes a long time to perform cargo handling work on a pallet load of products. Hence, after taking the pallet 26 to the vehicle loading and unloading bay, the transportation vehicle is separated from the pallet 26 and performs another transportation work. During this period of time, at the vehicle loading and unloading bay 24, the cargo handling work of the product C is performed on the pallet 26.

The off-site temporary storage space 25 is an area in the warehouse 2 where the product C can be moved in and moved out in addition to the vehicle loading and unloading bay 24 described above. In the present embodiment, among the products C currently stored in the warehouse 2, a product scheduled to be shipped in the near future (hereinafter, referred to as a product to be shipped) is conveyed from the top of the frame 23 and placed on the off-site temporary storage space 25 by the overhead crane 21. Moreover, for example, cargo handling facilities such as forklifts can enter the off-site temporary storage space 25 in addition to the pallets. The products to be shipped (products on the off-site temporary storage space illustrated in FIG. 2), which are arranged side by side on the off-site temporary storage space 25 such as above, are carried out from the warehouse by cargo handling facilities such as forklifts and transported to the shipping berth. Then, the product to be shipped in the shipping berth is loaded on a vessel and the like, and is shipped to the customer.

Inventory Information

Next, specific examples of the inventory information will be described with reference to FIG. 4.

Figure 4:
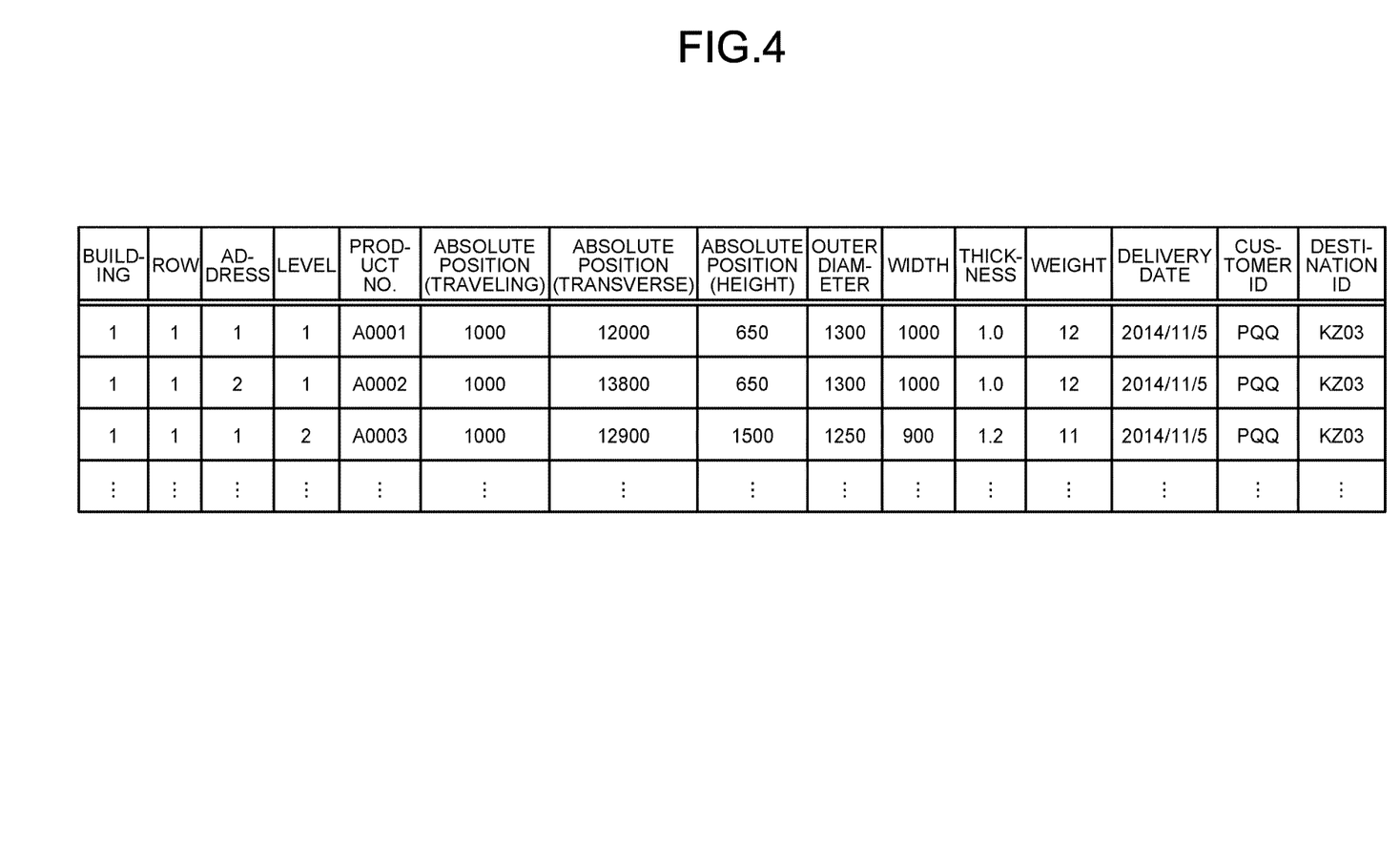
FIG. 4 is a diagram illustrating an example of inventory information.

FIG. 4 is a diagram illustrating an example of inventory information. In the present embodiment, the inventory information on each warehouse 2 is stored in the inventory information DB 12*a* of the cargo handling work generation device 1 illustrated in FIG. 1 in an updatable manner, and is managed as the latest information. As described above, the inventory information is information indicating at least a storage location of the product C currently stored in each of the warehouses 2 including the target warehouse. Specifically, as illustrated in FIG. 4, the inventory information includes building number, row number, address, and level number, as the location information indicating the latest storage location of each product C at the current time. The building number is information that identifies one of the warehouses 2, and is assigned to each of the warehouses. The row number is the row number L (see FIG. 2) that identifies the row location of the frame 23 described above, and the address is the address A (see FIG. 3) that identifies the location of the fixing table 23*a* for each frame 23 described above. The level number is the level number i (see FIG. 3) that identifies the arrangement level of the product C on the frame 23 described above. By using a combination of the location information described above, it is possible to identify the warehouse 2 where the product C is stored and the storage location of the product C in the warehouse 2.

Moreover, as the location information indicating the storage location of the product C described above, the inventory information includes information indicating each of the absolute position in the traveling direction D2, the absolute position in the transverse direction D1, and the absolute position in the height direction. The absolute position in the traveling direction D2 is the absolute position of the product C along the traveling direction D2 of the overhead crane 21 illustrated in FIG. 2, and corresponds to the row location of the frame 23 identified by the row number L described above. The absolute position in the transverse direction D1 is the absolute position of the product C along the transverse direction D1 of the overhead crane 21 illustrated in FIG. 2, and the absolute position in the height direction is the absolute position of the product C along the perpendicular direction (vertical direction) of the frame 23. The absolute positions are used as the location information on the conveyance source of the product C which is instructed to the overhead crane 21 by the crane control computer 22, when the overhead crane 21 is automatically controlled by automatic operation of the crane.

Furthermore, the inventory information includes information such as the product number, product outer diameter, product width, product thickness, product weight, delivery date, customer ID, and destination ID. The product number is product identification information that identifies the product C currently stored in the storage location indicated by the location information described above. The product outer diameter, product width, and product weight are each product specification information indicating the specifications of the product such as the size (for example, coil size) and weight. The delivery date is information indicating the shipment delivery date of the product C. The customer ID is customer identification information that identifies the customer (client) requesting the product C. The destination ID is the shipping destination identification information that identifies the port of discharge of the product C.

Shipping Product Information

Next, specific examples of the shipping product information will be described with reference to FIG. 5.

Figure 5:
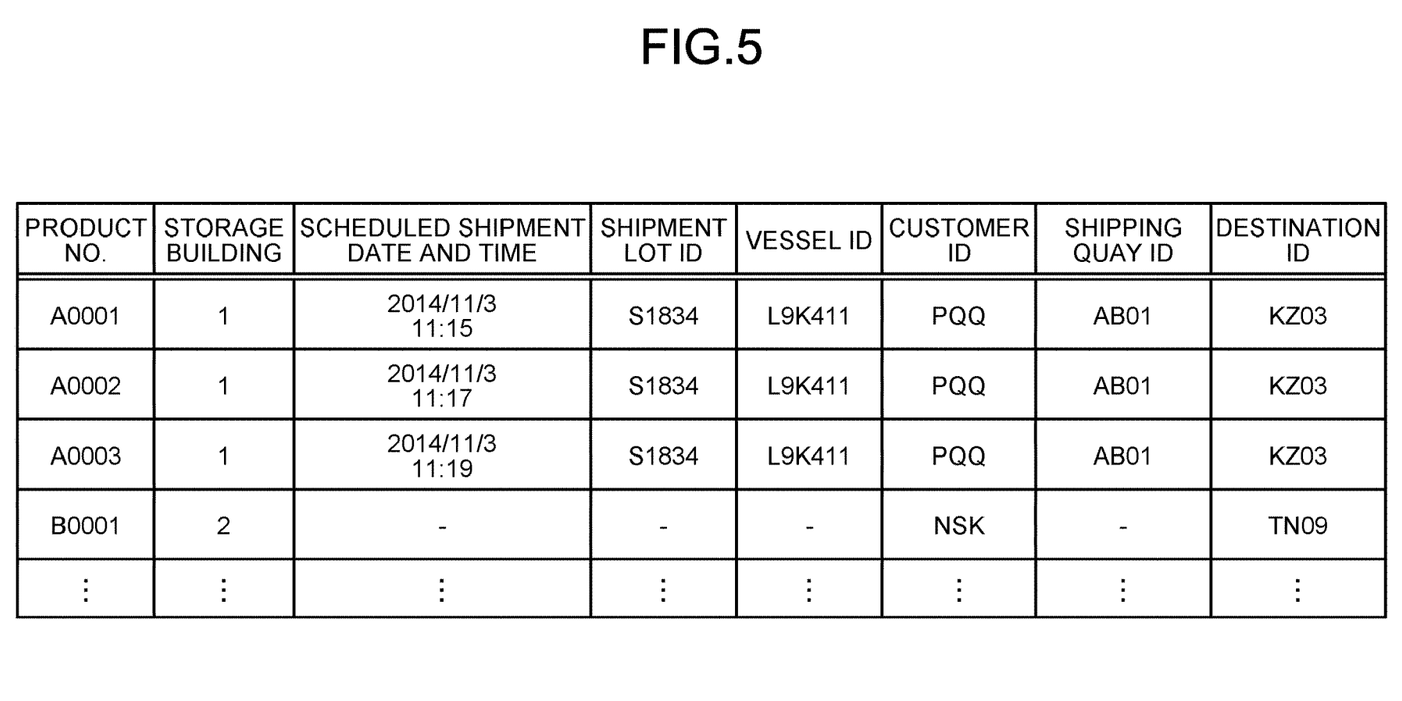
FIG. 5 is a diagram illustrating an example of shipping product information.

FIG. 5 is a diagram illustrating an example of shipping product information. In the present embodiment, the shipping product information on each warehouse 2 is stored in the shipping product information DB 12b of the cargo handling work generation device 1 illustrated in FIG. 1 in an updatable manner, and is managed as the latest information. As described above, the shipping product information is information indicating the shipping conditions of the product C currently stored in each of the warehouses 2 including the target warehouse. Specifically, as illustrated in FIG. 5, the shipping product information includes the product number, building number, scheduled shipment date and time, shipment lot ID, vessel ID, customer ID, shipping quay ID, and destination ID, as the latest shipping conditions of each product at the current time.

The product number and building number are associated with various types of information such as the location information in the inventory information, by correlating the product number and the building number with the inventory information. The scheduled shipment date and time is information indicating the shipping schedule of the product C identified by the product number serving as the product identification information described above. In detail, the scheduled shipment date and time indicates the scheduled date and time when the product C is expected to be loaded for shipment. The shipment lot ID is information that indicates the distribution lot of the product C at the time of shipment. The vessel ID is information that identifies the vessel onto which the product C is loaded. The customer ID is information that identifies the customer of the product C (customer identification information). The shipping quay ID is information that identifies the location where the product C is loaded on a vessel, that is, the shipping berth. The destination ID is information that identifies the shipping destination of the product C (shipping destination identification information). Some of the products in the warehouse 2 have a delivery date further away, or are not scheduled to be shipped yet. For such products, for example, as the product with the product No. "B0001" in FIG. 5, unconfirmed items are left blank.

Constraints

Next, specific examples of constraints will be described with reference to FIG. 6.

Figure 6:
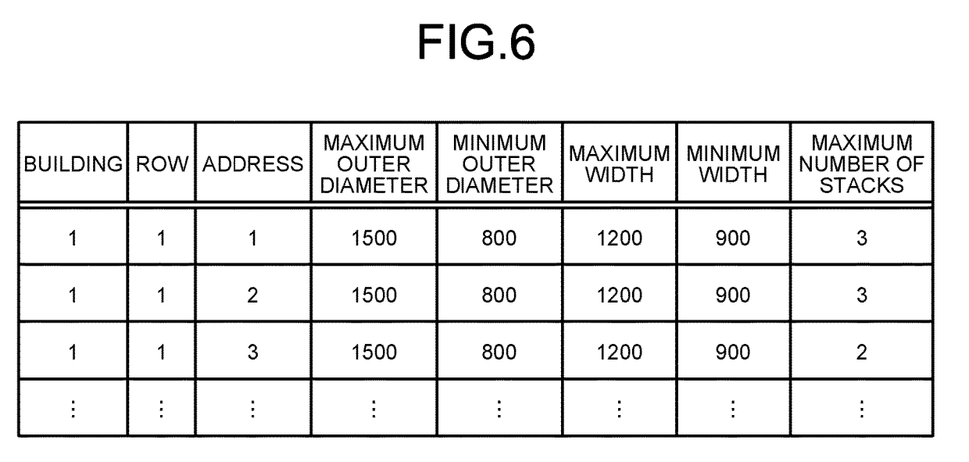
FIG. 6 is a diagram illustrating an example of constraints.

FIG. 6 is a diagram illustrating an example of constraints. In the present embodiment, the constraints are stored in the master information DB 12c of the cargo handling work generation device 1 illustrated in FIG. 1 in an updatable manner, and are managed as the latest information. As described above, the constraints are conditions such as the product size that can be stored in each of the warehouses 2. Specifically, as illustrated in FIG. 6, the constraints include the building number, row number, address, maximum outer diameter, minimum outer diameter, maximum width, minimum width, and maximum number of stacks, as the latest conditions relating to the storage of the product C to be constrained for each warehouse 2. The building number, row number, and address are the same information as those included in the inventory information described above. The constraints are associated with various types of information such as the location information in the inventory information, by correlating the building number, row number, and address with the warehouse information. The maximum outer diameter indicates the upper limit value of the outer diameter of the product C that can be placed at each storage location, which is identified by the location information (specifically, building number, row number, and address) described above. The minimum outer diameter indicates the lower limit value of the outer diameter of the product C that can be placed at each storage location described above. The maximum width indicates the upper limit value of the width of the product C that can be placed at each storage location described above. The minimum width indicates the lower limit value of the width of the product C that can be placed at each storage location described above. The maximum number of stacks indicates the upper limit value of the number of stacks of the products C that can be placed at each storage location described above.

Moreover, the constraints include information such as a rule which is a collection of constraints related to the products above and below, when the products C are stacked on the frame 23 as illustrated in FIG. 3. For example, to stack the products C, the product C to be placed on the top must satisfy the constraints specified by the size and characteristics of the product to be placed underneath during stacking, in addition to satisfying the upper and lower limit values of the size specified for each storage location described above. For example, a constraint such as "If the width of the product underneath is W cm, the width of the product to be stacked on the top must be equal to or more than $W-\alpha_1$ cm and equal to or less than $W+\alpha_2$ cm ($\alpha_1$, $\alpha_2$ are set values as well as positive values)" will be added. The constraints vary according to the width (W) of the product C placed underneath. Similarly, constraints related to the outer diameter and weight of the product C to be placed on the top are set based on the outer diameter and weight of the product C placed underneath. In some cases, a constraint of "products must not be stacked on top of one other" may be added due to a reason the product C is easily deformable and the like. Moreover, in addition to the size constraints, a constraint such as "to stack another product on top of a product scheduled to be shipped in the near future, the product to be placed on the top must also be scheduled to be shipped in the near future" may be added. For example, these constraints may be described and set using inequalities and the like.

Cargo Handling Work Creation Method

Figure 7:
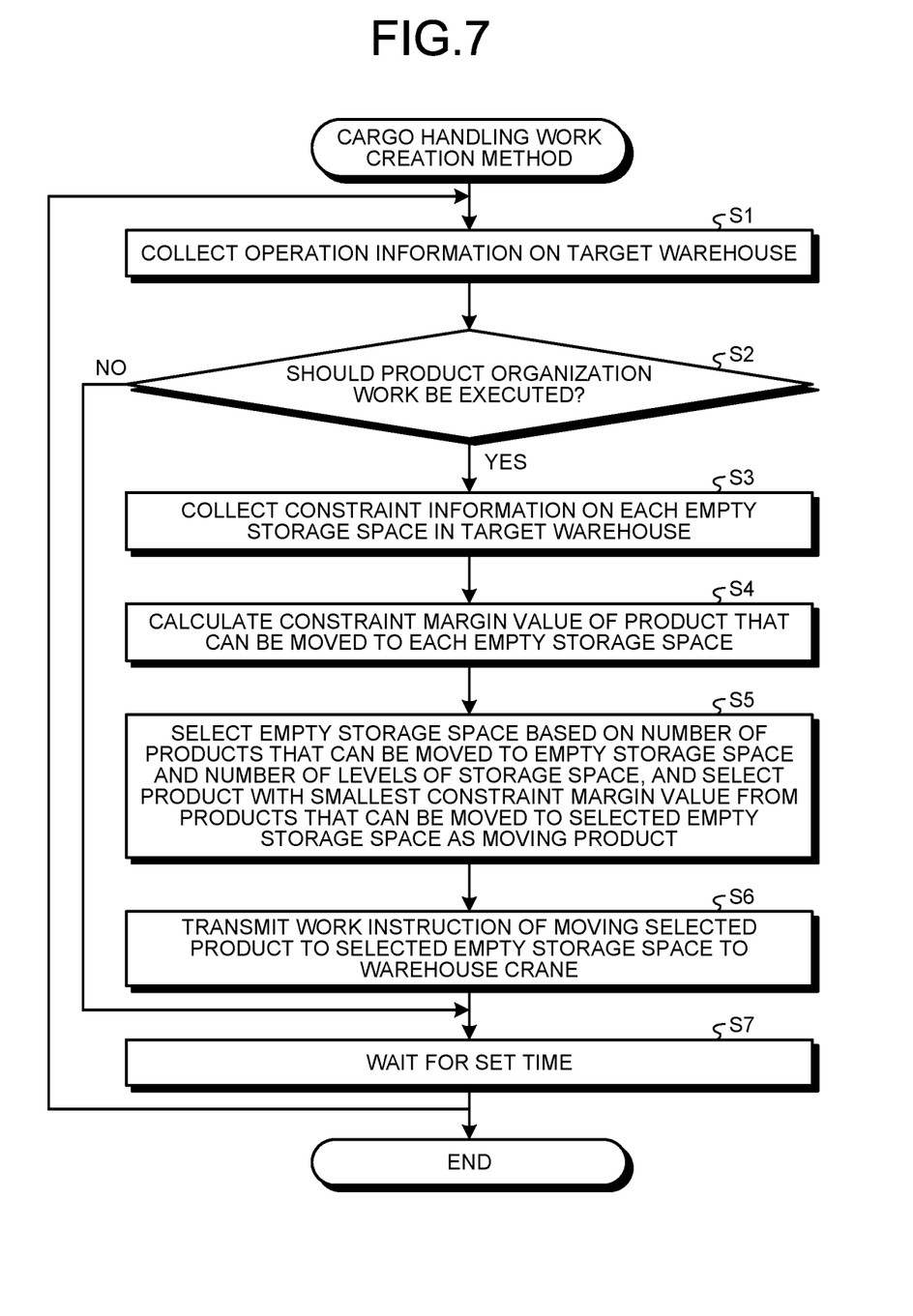
FIG. 7 is a flowchart illustrating a flow of a cargo handling work generation method according to an embodiment of the present invention.

Finally, a cargo handling work generation method according to an embodiment of the present invention will be described with reference to FIG. 7. FIG. 7 is a flowchart illustrating a flow of a cargo handling work generation method according to an embodiment of the present invention. The flowchart illustrated in FIG. 7 starts at the timing when the cargo handling work generation device 1 is activated, and the cargo handling work generation method proceeds to the processing at step S1. In the cargo handling work generation method, the cargo handling work generation device 1 sequentially executes the processing steps illustrated in FIG. 7, and generates cargo handling work in the target warehouse to be controlled among the warehouses 2. The flowchart illustrated in FIG. 7 is the processing on a single warehouse. However, the cargo handling work generation device 1 executes the processing on multiple warehouses.

In the processing at step S1, the cargo handling work generation device 1 collects operation information on the overhead crane 21 from the crane control computer 22 of the target warehouse, a production plan creating computer, and the like. In the present embodiment, the operation information on the overhead crane 21 is collected on a regular basis, by waiting for a set time in the processing at step S7, which will be described below. However, the operation information need not be collected on a regular basis. For example, the operation information may also be collected by causing the overhead crane 21 to transmit a signal at the point when the operation of the overhead crane 21 is completed. In this case, the processing at step S7 may be omitted. Consequently, the processing at step S1 is completed, and the cargo handling work generation method proceeds to the processing at step S2.

In the processing at step S2, the status judging unit 11 judges whether the product organization work should be performed, based on the operation information on the overhead crane 21 collected in the processing at step S1. Specific examples of judging criteria include when the overhead crane 21 is in a state of waiting for work as described above. If it is judged that the product organization work should be performed (Yes at step S2), the status judging unit 11 proceeds the cargo handling work generation method to the processing at step S3. On the other hand, if it is judged that the product organization work should not be performed (No at step S2), the status judging unit 11 proceeds the cargo handling work generation method to the processing at step S7.

In the processing at step S3, the storage space checking unit 13a collects constraint information on each empty storage space in the target warehouse. Examples of the constraint information include constraint information related to the product size (for example, upper and lower limit values of the width, outer diameter, thickness, and weight), constraint information related to the scheduled shipping date (for example, scheduled shipping date is earlier than the specified date), and constraint information related to the product material (for example, limited by the product placed underneath). Consequently, the processing at step S3 is completed, and the cargo handling work generation method proceeds to the processing at step S4.

In the processing at step S4, the product checking unit 13b generates a list of products (in the target warehouse) that can be moved to an empty storage space in the target warehouse, for each empty storage space. In this process, there may be multiple products that can be moved to the target empty storage space. The products to be included in the list are limited to those placed on the lower level when the target empty storage space at the current time. By moving the product to the storage space at a higher level, it is possible to easily increase the number of products that can be placed in the target warehouse. Furthermore, the product checking unit 13b calculates a constraint margin value $\rho_k$ of each product included in the list. For example, the following Equation 1 is an example of a formula for calculating the constraint margin value $\rho_k$.

$$\rho_k = w_1 p_{k,1}(X_1) + w_2 p_{k,2}(X_2) + \ldots + w_N p_{k,N}(X_N) \quad (1)$$

In Equation 1, $X_1$ to $X_N$ indicate various types of information m (=1 to N) on the target product, such as information on the outer diameter and width of the target product. Moreover, $p_{k,m}(\ )$ is a function for calculating the constraint margin value with respect to an empty storage space k for each of the various types of information m (=1 to N) on the target product, and $w_m$ is the weight coefficient for each function. As an example of the function $p_{k,m}(\ )$ for example, it is assumed that $X_1$ is the width of the target product taking the value of 1000 mm, and the lower limit value and the upper limit value of the width of the target product that can be placed on the empty storage space k are 950 mm and 1200 mm, respectively. In this case, the difference between the width of the target product and the lower limit value is 50 mm, and the difference between the width of the target product and the upper limit value is 200 mm. Hence, for example, the calculation method for the function $p_{k,m}(\ )$ should be defined such that the smaller value of 50 is the value of $p_{k,1}(X_1)$. Moreover, the functions $p_{k,2}(X_2)$ to $p_{k,N}(X_N)$ for various types of other information on the target product may be similarly set to take a smaller value with a reduction in margin from the constraints. Consequently, the processing at step S4 is completed, and the cargo handling work generation method proceeds to the processing at step S5.

In the processing at step S5, the work generation unit 13c first selects an empty storage space at a moving destination of the target product, based on the number of levels of the empty storage space and the number of products that can be moved to the empty storage space (the number of products in the list generated in the processing at step S5). Specifically, in general, a product storage space with the larger number of levels tends to have severe constraints on the product to be placed, and the number of products that can be placed in the entire warehouse tends to increase with an increase in the products that can be placed on the higher level. Hence, the work generation unit 13c selects an empty storage space with the largest number of levels (at a higher place). If multiple empty storage spaces (of the same number of levels) are selected, the work generation unit 13c may select the empty storage space to which the less number of products can be moved.

Next, the work generation unit 13c determines the product (moving product) to be moved to the selected empty storage space. Specifically, the work generation unit 13c selects the product with the smallest constraint margin value $\rho_k$ described above as the moving product. In the present embodiment, the constraint margin value is aggregated into a single value of $\rho_k$. However, the moving product may also be determined without aggregating the constraint margin value. For example, priorities may be set for the constraint margin values of various types of information $X_m$ on the target product, and a product with a small margin $p_{k,m}(X_m)$ from the constraint margin value of high priority may be selected. If the margins are the same, the margins from the constraint margin value of the next highest priority are compared. Consequently, the processing at step S5 is completed, and the cargo handling work generation method proceeds to the processing at step S6.

In the processing at step S6, the work generation unit 13c transmits information on the empty storage space determined in the processing at step S5 and the product to be moved to the empty storage space, to the output unit 14. The output unit 14 then transmits the work instruction of the overhead crane 21 to the crane control computer 22. Consequently, the processing at step S6 is completed, and the cargo handling work generation method proceeds to the processing at step S7.

In the processing at step S7, the product organization work determination unit 13 waits for a set time. Consequently, the processing at step S7 is completed, and the cargo handling work generation method returns to the processing at step S1.

As is obvious from the above description, the cargo handling work generation device 1 according to the embodiment of the present invention includes the product organization work determination unit 13 that determines the contents of cargo handling work of product organization to be executed, using the information stored in the inventory information DB 12a, the shipping product information DB 12b, and the master information DB 12c. The product organization work determination unit 13 includes the storage space checking unit 13a that extracts the constraints to be satisfied by the product in each empty storage space in the product storage space, the product checking unit 13b that calculates a margin for the constraints of the product in each empty storage space, and the work generation unit 13c that generates moving work for moving a product to each empty storage space, based on the constraints and the margin. Consequently, it is possible to increase the storage capacity of the warehouse 2. Moreover, the product can be moved smoothly from the production line and the like to the warehouse 2, thereby improving logistics efficiency. Furthermore, even if the product unloading amount from the warehouse 2 is reduced due to a trouble such as a stoppage of shipment caused by bad weather and the like, it is possible to prevent troubles such as the product cannot be moved from the production line because there is no empty space in the warehouse 2 and stopping the production line.

Figure 8:
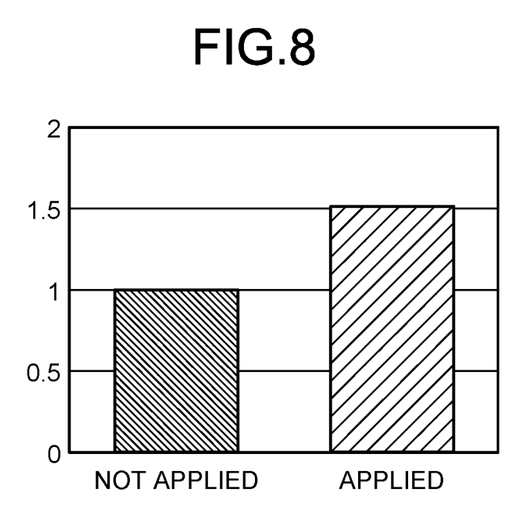
FIG. 8 is a diagram in which ratios of product storage areas where products are stacked in the warehouse are compared, when the present invention is applied and when the present invention is not applied.

Finally, the test result when the present invention is applied to the actual device will be illustrated. FIG. 8 is a diagram in which ratios of product storage areas where products are stacked in the warehouse are compared, when the present invention is applied and when the present invention is not applied. In FIG. 8, the stacking ratio when the present invention is not applied is set to one. As illustrated in FIG. 8, by applying the present invention, the ratio of the stacking storage space is increased by about 50%. Therefore, by applying the present invention, it is possible to significantly increase the storage capacity of the warehouse and contribute to logistics efficiency.

The embodiments to which the invention made by the present inventors is applied have been described above. However, the present invention is not limited by the description and the drawings that form part of the disclosure of the present invention by the present embodiments. That is, other embodiments, examples, operating techniques, and the like carried out by those skilled in the art and the like based on the present embodiments are all included in the scope of the present invention.

INDUSTRIAL APPLICABILITY

With the cargo handling work generation device and the cargo handling work generation method according to the present invention, it is possible to increase the storage capacity of the product storage space.

REFERENCE SIGNS LIST 1 cargo handling work generation device
2 warehouse
11 status judging unit
12 data storage unit
12a inventory information database (inventory information DB)
12b shipping product information database (shipping product information DB)
12c master information database (master Information DB)
13 product organization work determination unit
13a storage space checking unit
13b product checking unit
13c work generation unit
14 output unit
21 overhead crane
22 crane control computer

The invention claimed is:

1. A cargo handling work generation device, comprising:
an inventory information database configured to store inventory information indicating at least a storage location of a product currently stored in a product storage space;
a shipping product information database configured to store shipping product information indicating a shipping condition of the product;
a master information database configured to store a constraint related to product arrangement in the product storage space;
a status judging unit configured to judge whether cargo handling work of product organization be assigned to an overhead crane provided in the product storage space, based on operation information on the overhead crane, the cargo handing work of product organization being a product organization work to place as many products as possible in the product storage space;
a product organization work determination unit configured to, when the status judging unit judges to assign the cargo handling work of product organization to the overhead crane, determine a content of the cargo handling work of product organization to be executed, using the information stored in the inventory information database, the shipping product information database, and the master information database; and
an output unit configured to
output instruction information for instructing a crane control computer to execute the cargo handling work of product organization determined by the product organization work determination unit, and
cause the crane control computer to control the overhead crane to perform the cargo handling work including lifting and conveying the product from a location of a conveyance source to a target location of a conveyance destination by automatic operation, wherein
the product organization work determination unit includes
a storage space checking unit configured to extract a constraint to be satisfied by a product in each empty storage space in the product storage space,
a product checking unit configured to calculate a margin for the constraint of the product in each of the empty storage spaces, and
a work generation unit configured to
determine products that are able to be moved to each empty storage space based on the constraint,
select a product to be moved to each empty storage space from the determined products based on the margin, and
generate moving work for moving the selected product as a content of the cargo handing work of product organization, and
the operation information on the overhead crane is information on an operation status of the overhead crane including (i) whether or not cargo handling work by the overhead crane is currently in progress, (ii) whether or not there is receiving and dispatching work being booked, (iii) whether or not shipping product assortment work is currently in progress, (iv) whether or not there is shipping product assortment work being booked, and (v) whether or not a number of products scheduled to be shipped in the near future in the product storage space is less than a set number.

2. The cargo handling work generation device according to claim 1, wherein
the constraint includes a condition related to dimension and weight of a product to be stacked, and
the work generation unit is configured to preferentially select an empty storage space at a high location, when an empty storage space at a moving destination of the product is to be determined.

3. The cargo handling work generation device according to claim 1, wherein
the margin for the constraint of the product is
a differential value between (i) an upper or lower limit value of a dimension of the product and (ii) an actual dimension of the product, or
a differential value between (i) an upper or lower limit value of a weight of the product and (ii) an actual weight of the product.

4. The cargo handling work generation device according to claim 3, wherein
the smaller of (i) the differential value between the upper limit of the dimension of the product and the actual dimension of the product and (ii) the differential value between the lower limit of the dimension of the product and the actual dimension of the product is selected as the margin, or
the smaller of (i) the differential value between the upper limit of the weight of the product and the actual weight of the product and (ii) the differential value between the lower limit of the weight of the product and the actual weight of the product is selected as the margin.

5. A cargo handling work generation method comprising:
a status judging step of judging whether cargo handling work of product organization be assigned to an overhead crane provided in a product storage space, based on operation information on the overhead crane, the cargo handing work of product organization being a product organization work to place as many products as possible in the product storage space;
a product organization work determination step of determining product organization work that, when the cargo handling work of product organization is judged to be assigned to the overhead crane at the step of judging status, determines a content of the cargo handling work of product organization to be executed, using information stored in an inventory information database that stores inventory information indicating at least a storage location of a product currently stored in the product storage space, a shipping product information database that stores shipping product information indicating a shipping condition of the product, and a master information database that stores a constraint related to product arrangement in the product storage space; and
an outputting step of
outputting instruction information for instructing a crane control computer to execute the cargo handling work of product organization determined at the step of determining product organization work, and
causing the crane control computer to control the overhead crane to perform the cargo handling work including lifting and conveying the product from a location of a conveyance source to a target location of a conveyance destination by automatic operation,
wherein
the product organization work determination step includes
a storage space checking step of extracting a constraint to be satisfied by a product in each empty storage space in the product storage space,
a product checking step of calculating a margin for the constraint of the product in each of the empty storage spaces, and
a work generation step of
determining products that are able to be moved to each empty storage space based on the constraint,
selecting a product to be moved to each empty storage space from the determined products based on the margin, and
generating moving work for moving the selected product as a content of the cargo handing work of product organization, and
the operation information on the overhead crane is information on an operation status of the overhead crane including (i) whether or not cargo handling work by the overhead crane is currently in progress, (ii) whether or not there is receiving and dispatching work being booked, (iii) whether or not shipping product assortment work is currently in progress, (iv) whether or not there is shipping product assortment work being booked, and (v) whether or not a number of products scheduled to be shipped in the near future in the product storage space is less than a set number.

6. The cargo handling work generation method according to claim 5, wherein
the constraint includes a condition related to dimension and weight of a product to be stacked, and
the work generation step includes a step of preferentially selecting an empty storage space at a high location, when an empty storage space at a moving destination of the product is to be determined.

7. The cargo handling work generation method according to claim 5, wherein
the margin for the constraint of the product is
a differential value between (i) an upper or lower limit value of a dimension of the product and (ii) an actual dimension of the product, or
a differential value between (i) an upper or lower limit value of a weight of the product and (ii) an actual weight of the product.

8. The cargo handling work generation method according to claim 7, wherein
the smaller of (i) the differential value between the upper limit of the dimension of the product and the actual dimension of the product and (ii) the differential value between the lower limit of the dimension of the product and the actual dimension of the product is selected as the margin, or
the smaller of (i) the differential value between the upper limit of the weight of the product and the actual weight of the product and (ii) the differential value between the lower limit of the weight of the product and the actual weight of the product is selected as the margin.

* * * * *